United States Patent [19]

Fujibayashi

[11] 4,338,639

[45] Jul. 6, 1982

[54] CUE SIGNAL RECORDING APPARATUS

[75] Inventor: Kenji Fujibayashi, Nogata, Japan

[73] Assignee: Olympus Optical Co., Ltd., Tokyo, Japan

[21] Appl. No.: 138,195

[22] Filed: Apr. 7, 1980

[30] Foreign Application Priority Data

Apr. 20, 1979 [JP] Japan .................................. 54-48698

[51] Int. Cl.³ .......................... G11B 5/47; G11B 5/02
[52] U.S. Cl. ........................................ 360/66; 360/68
[58] Field of Search ...................... 360/60, 66, 67, 68, 360/27, 72.2, 74.4, 18, 57

[56] References Cited

U.S. PATENT DOCUMENTS

| 3,368,032 | 2/1968 | Gooch et al. ......................... 360/66 |
| 4,007,491 | 2/1977 | Bolick, Jr. et al. ................ 360/74.4 |
| 4,244,009 | 1/1981 | Saroh ..................................... 360/68 |
| 4,249,041 | 2/1981 | Smith et al. ........................... 360/60 |

Primary Examiner—Vincent P. Canney
Attorney, Agent, or Firm—Frishauf, Holtz, Goodman and Woodward

[57] ABSTRACT

A cue signal recording apparatus includes a recording head, a bias circuit for feeding a bias current to the recording head, a cue signal generating circuit for applying a cue signal to the recording head, and means for weakening a recording bias magnetic field caused by the bias current when the cue signal is recorded by the recording head on a tape with something already recorded in a superposing manner.

27 Claims, 3 Drawing Figures

CUE SIGNAL RECORDING APPARATUS

BACKGROUND OF THE INVENTION

The invention relates to a cue signal recording apparatus for a tape recorder which is adapted to use a cue signal for dictation and transcription, for example.

In a tape recorder for dictation and transcription, for example, a cue signal is used for searching for a desired recording portion while performing a fast forward (FF) or a rewind (REW) operation.

The cue signal is a sine wave signal having an extremely low frequency within a range from a few Hz to several tens of Hz and having a relatively low level. In a normal tape transport, it can not be heard as a reproduction signal. When a tape is transported for making a cue, the cue signal is acoustically reproduced. A cue signal of 30 Hz is assumed to be recorded on a tape over a 10-second distance. When such a tape is reproduced at a speed of 20 times the constant recording or normal playback speed, the cue signal is reproduced for 0.5 second with the frequency of 600 Hz. The desired recording portion may be found by detecting the cue signal of 600 Hz.

In a conventional cue signal recording apparatus, the recording of the cue signal is normally performed simultaneously with the recording of a sound for dictation. When using such conventional type of apparatus, it is difficult to record the cue signal on the same track of a recorded tape in superposing manner. The reason for this is that a bias magnetic field demagnetizes a sound signal already recorded when the cue signal is recorded. In other words, when the cue signal is superposed on the voice sound in the recording, the sound level of the recorded voice sound is extremely reduced. However, when a large amplitude cue signal is recorded with no bias, the demagnetization due to the bias magnetic field does not occur, although much of the high harmonic distortion included in the cue signal is reproduced in the constant speed transport. As described above, in the conventional device, it is very difficult to record the cue signal superposed on the speech or musical sound, without damaging the recorded sound.

An approach directed to overcome the above-mentioned disadvantages of the conventional apparatus is disclosed in U.S. Pat. No. 4,007,491. The system in this patent employs tracks 41, 42 and 44 exclusively used for index signals in addition to a sound track 40. In this proposal, when the cue signal is recorded on the tracks for index signals, the above-mentioned problem, i.e. the demagnetizing effect due to the bias magnetic field is avoidable in the superposing recording of the cue signal. This system, however, is not compatible with the conventional tape recorder provided with no index tracks, i.e. a tape recorder of which the recording track arrangement is standardized, e.g. a microcassette tape recorder.

SUMMARY OF THE INVENTION

Accordingly, an object of the invention is to provide a cue signal recording apparatus for a tape recorder which is capable of making a superposed recording of a cue signal on a track with something already thereon without damaging the contents recorded.

To achieve the above object, the cue signal recording apparatus for a tape recorder according to the invention is provided with a means for weakening a bias magnetic field for the magnetic head used when a cue signal is recorded. By weakening the bias magnetic field, the superposing recording of the cue signal is possible without little damaging the contents already recorded on the track. It follows that a variation of the reproduction level with respect to a bias current is very broad in the extremely low frequencies.

FIG. 1 shows variations of the reproduction or playback level with respect to the bias current with a parameter of a recording signal frequency. In FIG. 1, the reproduction level maximum point, i.e. the peak bias point, is set to 0 dB on the ordinate. The bias current fed to the recording head is plotted on the abscissa. The curves in FIG. 1 depend on the kind of the recording head or the magnetic recording medium (such as recording tape) used, etc. In this respect, numerals in the graph do not have any special meanings. It is noted, however, that, in the bias current range from 0.6 mA to 0.7 mA, a sound signal of 1 KHz is in the under-bias condition. Under this condition, the playback output of a 1 KHz recording is reduced and further a distortion of the playback sound increases. With respect to 30 Hz or less as the cue signal frequency band, there is not observed such an extremely insufficient bias.

Generally, an optimum bias for sound recording is set up in the following manner. A single tone of about $-20$ dB level from the saturation level, which has a frequency within a range of 400 Hz to 1 KHz is provided. Under this condition, as the bias current is gradually increased, the playback level increases to reach the maximum value and then decreases again. The optimum bias is set to a point of the maximum value or an overbias point which is lower than the maximum value of the playback level by $-0.5$ dB to $-1.0$ dB. In the graph of FIG. 1, the optimum bias point is denoted as A. The optimum bias is determined on the basis of a balance between the reproduction or playback level and the distortion. When a cue signal is recorded on the previously recorded magnetic recording medium, such as tape, with the optimum bias current, the signal level previously recorded is reduced. The experiment showed this level reduction at 1 KHz, for example, was $-10$ dB to $-15$ dB. The level reduction becomes more and more marked as the recording signal frequency is higher. When the bias current is reduced to a point B shown in FIG. 1, the level reduction at 1 KHz signal due to the cue signal superposing is reduced to $-3$ dB to $-4$ dB.

As seen from FIG. 1, the bias current at the point B is insufficient for the 1 KHz signal, but the insufficiency of the bias current for the 30 Hz cue signal is not much or rather, rather, slight. The insufficiency to such a degree provides a slight amount of the higher harmonic distortion of 60 Hz, 120 Hz, 180 Hz, . . . . Therefore, it could hardly be noticed in the constant speed tape transport. In short, the object of the invention can be achieved by reducing the bias current or bias magnetic field to such an extent that the higher harmonic distortion of the cue signal is not in the forefront. Accordingly, in recording the cue signal in the superposing manner, the necessary amount of the bias current decrease is determined depending on many factors; the magnetic property of the magnetic recording medium such as tape, a characteristic of the magnetic head, tape transport speed, cue signal frequency, cue signal level, the way of setting a reference bias in a normal recording mode, tolerable amount of the demagnetization of the sound caused by the superposing recording, and the like. Generally, a proper amount of the reduction of the bias current or magnetic field is 20 to 50% of the reference bias and may be larger than this (e.g. 90%) when the higher harmonic distortion of the cue signal is not distinguished.

In the present invention, a sine wave signal with less distortion and a frequency ranging from 2 or 3 Hz to 50 or 60 Hz is preferable for the cue signal. The more preferable frequency of the cue signal is 10 Hz to 30 Hz, although it depends on a searching speed for searching the recorded contents by using the cue signal.

BRIEF DESCRIPTION OF THE DRAWINGS

Other objects and features of the invention will be apparent from the following description taken in connection with the accompanying drawings, in which.

DETAILED DESCRIPTION OF THE PREFERRED EMBODIMENT

Figure 1:
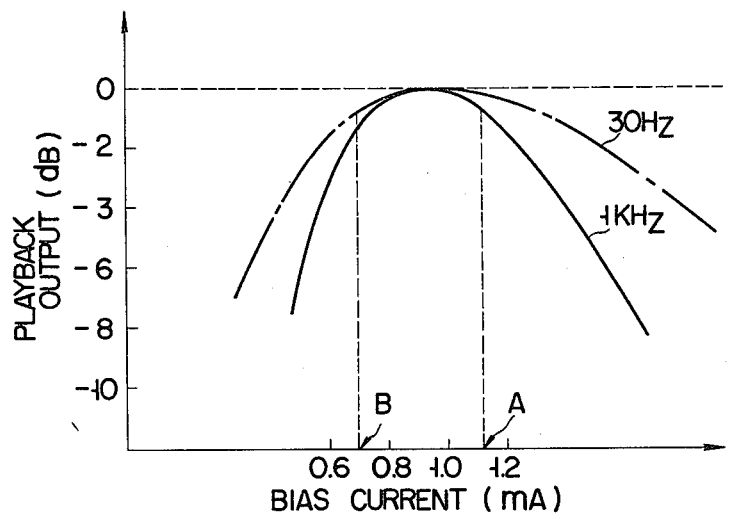
FIG. 1 is a graph illustrating relations of a bias current vs. a playback level with a parameter of a recording frequency.

For ease of explanation and illustration, like reference numerals are used for designating like or equivalent portions throughout the drawings. The magnetic recording medium is designated as "tape" herein for ease of description.

Figure 2:
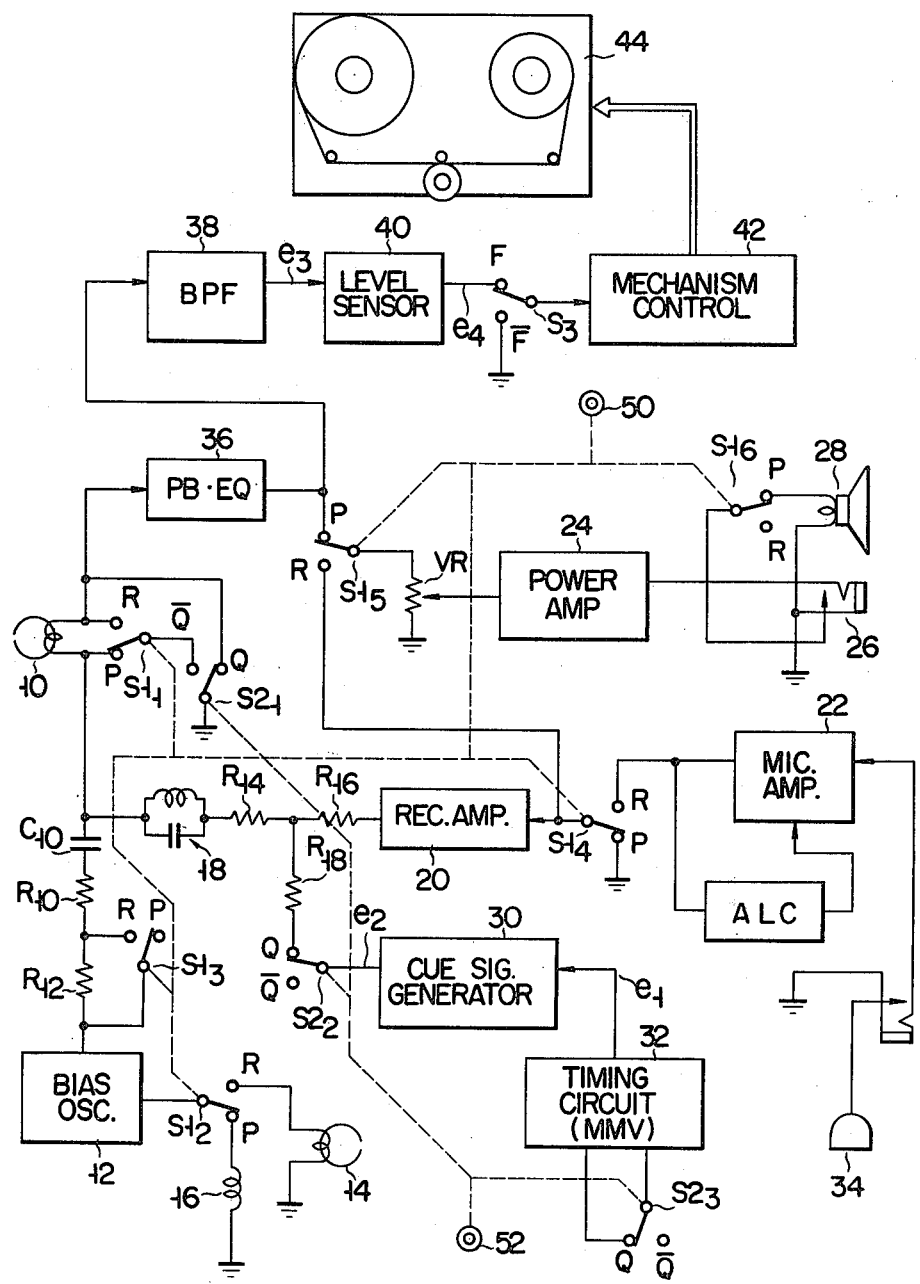
FIG. 2 is a block diagram of a cue signal recording apparatus which is an embodiment of the invention.

FIG. 2 shows an example of a circuit construction of the cue signal recording apparatus according to the invention. In FIG. 2, a state of a switch indicates a case where a cue signal is recorded in the superposing manner. A recording head 10 is connected at both terminals to the terminals R and P of a record/playback mode switch $S1_1$. The terminal R of the switch $S1_1$ is grounded via the terminal Q of a switch $S2_1$. The movable contact of the switch $S1_1$ is connected to the terminal $\overline{Q}$ of the switch $S2_1$. The terminal P of the switch $S1_1$ is coupled with a bias oscillator 12, through a capacitor C10, a resistor R10 and a resistor R12. The capacitor C10, the resistor R10, the resistor R12, and the oscillator 12 form a bias circuit. The oscillator 12 generates a bias current and an erasing current of several tens of KHz to about 100 KHz. The erasing current is fed to the movable contact of the switch $S1_2$ interlocking with the switch $S1_1$. The terminal R of the switch $S1_2$ is connected to an erasing head 14 while the terminal P is connected to a dummy load 16. For superposing the cue signal, a signal previously recorded must not be erased. For this reason the switch $S1_2$ is provided for changing the supply of the erasing current to the dummy load 16. In normal recording, the aforementioned optimum bias is required while, in a cue signal superposing recording, the bias current must be decreased. For switching the bias current, a switch $S1_3$ interlocking with the switch $S1_2$ is connected across the resistor R12. The resistor R12 is shortcircuited when the terminal R of the switch $S1_3$ is selected. In this case, optimum bias current is fed to a recording head 10. When the switch $S1_3$ selects the terminal P, as shown in FIG. 2, the bias current is reduced, for example, by 50%. The resistor R12 and the switch $S1_3$ form a means for weakening a recording bias magnetic field.

The terminal P of the switch $S1_1$ is coupled with the output terminal of a recording amplifier 20, by way of a bias trap 18, a resistor R14, and a resistor R16. The input terminal of the recording amplifier 20 is grounded through the terminal P of a switch $S1_4$ interlocking with the switch $S1_3$. In the normal recording mode, the output signal from a microphone amplifier 22 with an automatic level control function is applied to the input terminal of the recording amplifier 20, through the terminal R of the switch $S1_4$. The input terminal of the recording amplifier 20 is also connected to the terminal R of a switch $S1_5$ interlocking with the switch $S1_4$. The movable contact of the switch $S1_5$ is connected to a power amplifier 24, via a volume controller VR. The output terminal of the power amplifier 24 is connected to the movable terminal of a switch $S1_6$ interlocking with the switch $S1_5$, by way of an earphone jack 26. The terminal P of the switch $S1_6$ is connected to a speaker 28.

An output signal from a cue signal generator circuit 30 is applied to the connection point between the resistors R14 and R16, by way of a resistor R18 and a switch $S2_2$. The switches $S2_2$ and $S2_1$ are interlocked with each other. The timing of the cue signal generation by the cue signal generator circuit 30 is determined by a timing circuit 32. Through the operation of the timing circuit 32, the cue signal generator circuit 30 produces a cue signal for a fixed period of time. The timing circuit 32 is operated by a switch $S2_3$ interlocking with the switch $S2_3$. The timing circuit 32 is a monostable multivibrator triggered when the contact selection state of the switch $S2_3$ is $Q \rightarrow \overline{Q}$. In this case, when the contacts of the switches $S2_1$ to $S2_3$ are switched from Q to $\overline{Q}$, the following operation is performed.

When the timing circuit 32 is triggered by the switch $S2_3$, it produces a gate signal e1 with a pulse width of, e.g., 10 seconds. Upon receipt of the gate signal e1, the cue signal generator circuit 30 produces a cue signal e2 of 30 Hz for 10 seconds. The cue signal generator circuit 30 is comprised of an oscillator with an analog gate switch using an FET or the like at the output circuit. The analog gate is turned on and off in accordance with the level of the signal e1. Such a cue signal generator circuit 30 may be of the conventional type as frequently used in a tone burst oscillator. The cue signal e2 is applied to the recording head, through the switch $S2_2$, the resistor R18, the resistor R14, and the bias trap 18. In the superposing recording mode, the switches $S1_1$ to $S1_6$ select the terminal P. That is, no power is supplied to the erasing head 10 and the bias current fed to the recording head 10 is decreased. Under this condition, if the cue signal is recorded, the signal already recorded on the same recording track is little damaged. When the cue signal is recorded simultaneously with the normal microphone rcording, the switches $S1_1$ to $S1_6$ are switched to the terminal R. In this case, power is supplied to the erasing head and the recording bias is increased up to the optimum bias value. A sound signal from a fixed microphone 34, after being amplified by the amplifier 22, is inputted to the recording amplifier 20. The sound signal is superposed on the bias current of the optimum bias through the resistors R16 and R14, and the bias trap 18, and the superposed signals are supplied to the recording head. Under this condition, when the switches $S2_1$ to $S2_3$ are turned on ($\overline{Q} \rightarrow Q$), the cue signal of 30 Hz, for example, together with the sound signal, is recorded for 10 seconds.

As described above, the circuit shown in FIG. 2 can record the sound signal and the cue signal, simultaneously, and can also record the cue signal on the track where the sound signal is already recorded.

The cue signal, once recorded, is used for cuing a desired recording portion in the following manner. In the fast forward or rewind mode, the switches $S1_1$ to $S1_6$ select the terminal P, and switches $S2_1$ to $S2_3$ select the terminal $\overline{Q}$. At this time, the recording head 10 operates as a playback head. Assume that the tape transport speed in the fast forward mode is 10 to 30 times that in the constant speed transport mode, and that the cue signal has the frequency of 30 Hz. In this case, the fast forward induces the cue signal of 300 to 900 Hz into the head 10. Further, the normal sound signal frequency band ranging from 200 Hz to 6 KHz is shifted to the higher frequency band of 2 KHz (200 Hz×10) or more. The cue signal and sound signal are applied to a band-pass filter (BPF) 38, via a playback equalizer 36. The BPF 38 allows the frequencies from 300 to 900 Hz to effectively pass therethrough. In other words, the BPF 38 produces only the cue signal component e3. The filter 38 may be a low-pass filter.

The cue signal component e3 is applied to a level sensor 40 where the noise component ranging from 300 to 900 Hz and the true cue signal component e3 are distinguished from each other. Upon receipt of the cue signal component e3, the sensor 40 produces a cue signal detection pulse e4. The sensor 40 compares the peak level or the average level of the signal component e3, for example, with a given threshold level and produces the pulse e4 when the former exceeds the latter. That is, the sensor 40 is a kind of comparator with such a comparing function. The pulse e4 is inputted to a mechanism control circuit 42, through the terminal F of the cuing switch S3. The control circuit 42 is a logic control circuit for producing commands for commanding transport/stop of a tape transport mechanism 44. For example, when the tape travels to reach the cuing portion to produce the cue signal detection pulse e4, the control circuit 42 stops the fast forward operation of the mechanism 44. The control circuit 42 is of the conventional type which is used in a tape recorder of the logic control type now widely marketed. When the mechanism 44 is a mechanical tape deck not subjected to the logic control, the circuit 42 may be a plunger mechanism driven by the pulse e4. In this case, when the plunger is turned on, the fast forward mode of the mechanism 44 is switched to the stop mode. The plunger mechanism may be of the conventional type.

The switch S3 selects the terminal F only in the fast forward mode or the rewind operation mode, and selects the terminal $\overline{F}$ in other operation modes, for example, the playback mode. When the switch S3 selects the terminal $\overline{F}$, the control circuit 42 does not respond to the cue signal. The switches $S1_1$ to $S1_6$ are switched from the terminal P to the terminal R, by a recording button 50 and the switches $S2_1$ to $S2_3$ are switched from the terminal $\overline{Q}$ to the terminal Q by a cue signal recording button 52. Those switches $S1_1$ to $S1_6$ and $S2_1$ to $S2_3$ are independent of each other. At the time of recording of the cue signal, the input terminal of the playback equalizer 36 is always grounded. Therefore, in making the superposing recording of the cue signal, the cue signal and the bias signal are never transmitted to the power amplifier 24.

The major features of the circuit construction shown in FIG. 2 are summarized as follows:

(1) The circuit (30 and 32) to generate the cue signal for a given time is used. The circuit operates only when the cue signal recording button 52 or the second recording directing means is pressed. The circuit operates independently of the sound recording button 50 or the first recording directing means.

(2) The bias current switching means (R12, $S1_3$) is used. The bias current switching means is switched interlocking with the recording button 50. In the superposing recording of the cue signal, the bias current is reduced by this means. The bias current switching means operates independently of the cue signal recording button 52.

(3) The erasing head 14 is power-supplied only when the sound recording button 50 is pressed. The power supply is independent of the cue signal recording button 52.

(4) The head 10 operates as the recording head when the sound recording button 50 is pressed and as the playback head when button 50 is not pressed. When the cue signal recording button 52 is pressed, it serves as the recording head independently of the sound recording button 50.

(5) When the sound recording button 50 is not pressed, the recording amplifier 20 produces no recording signal.

(6) When the cue signal recording button 52 is pressed, the playback equalizer 36 produces no signal irrespective of the position of the sound recording button 50.

Figure 3:
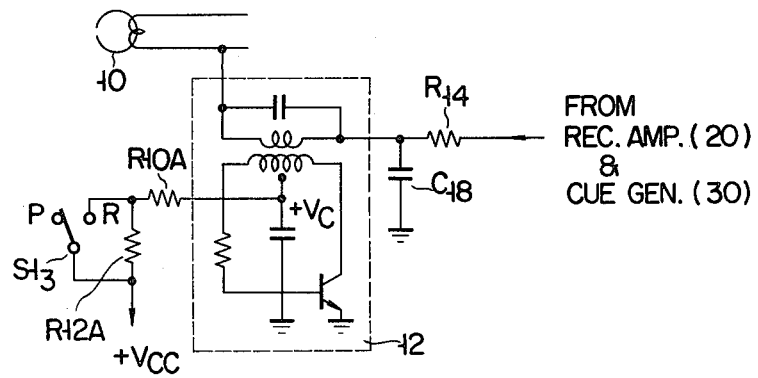
FIG. 3 is a circuit diagram of a modification of the periphery circuit of a bias oscillator used in the circuit shown in FIG. 2.

Although the specific construction have been illustrated and described herein, it is not intended that the invention be limited to the elements and constructions disclosed. One skilled in the art will recognize that other particular elements or subconstructions may be used without departing from the scope and spirit of the invention. The recording bias magnetic field may be weakened, for example, by decreasing the voltage +Vc supplied to the bias oscillator 12, as shown in FIG. 3. In this example, the effective supply voltage +Vc to the oscillator 12 is changed by shortcircuiting/opening a resistor R12A by means of the switch $S1_3$. That is, when the switch $S1_3$ is turned to the terminal P, the bias current is reduced. Alternatively, the oscillating frequency of the bias oscillator 12 may be increased in order to reduce the bias current. The cue signal may be reproduced by the erasing head 14 when the gap of the erasing head 14 is narrow. For example, when the cue signal of 30 Hz is recorded at the tape transport speed 2.4 cm/s, the wavelength of the cue signal is 0.8 mm. Accordingly, if the effective gap of the erasing head 14 is below 0.4 mm or less, the cue signal may be sufficiently be reproduced.

When the control circuit 42 includes a presettable counter to count the cue signal detection pulse e4, it can skip over a plurality of recording portions of the cue signal. For example, when the pulse e4 is inputted to the down counter with "3" preset therein, the down counter produces a carry out signal every three detections of the cue signal. The carry out signal may stop the tape transport mechanism 44 automatically.

In addition to the tape recorder, the present invention is applicable for a sound projector with a magnetic record/playback apparatus. The invention is also applicable for a tape recorder of the DC bias type.

What is claimed is:

1. A cue signal recording apparatus comprising:

a magnetic head for making recordings on a magnetic recording medium;

a bias means for feeding a bias current to said magnetic head;

a cue signal generating means for providing a cue signal to said magnetic head; and means responsive to operation of said cue signal generating means for weakening a recording bias magnetic field caused by said bias current when said cue signal is recorded by said magnetic head on the magnetic recording medium with something already recorded on the magnetic recording medium.

2. A cue signal recording apparatus comprising:

a magnetic head for making recordings on a magnetic recording medium;

a bias means for feeding a bias current to said magnetic head;

a first recording directing means operated when a sound signal is to be recorded;

a second recording directing means operated when a cue signal is to be recorded;

a cue signal generating means for producing a cue signal for a given period of time only when said second recording directing means is operated, independently of operation of said first recording directing means; and a bias current switching means which is switched interlocking with said first recording directing means, independently of operation of said second recording directing means, to reduce said bias current when a superposing recording of the cue signal is made on a portion of the recording medium which already has something recorded thereon.

3. An apparatus according to claim 2, further comprising an erasing head supplied with power only when said first recording directing means is operated independently of said second recording directing means.

4. An apparatus according to claim 2 or 3, wherein said magnetic head functions as:

(a) a recording head when said first recording directing means is operated and a playback head when not operated; and (b) a recording head independently of said first recording directing means when said second recording directing means is operated.

5. An apparatus according to claim 2 or 3, further comprising a recording means for providing a signal to be recorded to said magnetic head when said first recording directing means is operated.

6. An apparatus according to claim 4, further comprising a recording means for providing a signal to be recorded to said magnetic head when said first recording directing means is operated.

7. An apparatus according to claim 2 or 3, further comprising:

a playback means for stopping the supply of the playback output when said second recording directing means is operated independently of said first recording directing means.

8. An apparatus according to claim 4, further comprising a playback means for stopping the supply of the playback output when said second recording directing means is operated independently of said first recording directing means.

9. An apparatus according to claim 1, wherein an amount of the reduction of the bias magnetic field caused by said means for weakening the bias magnetic field is approximately 20 to 50% with respect to that of the magnetic field before being reduced.

10. An apparatus according to claim 2 or 3, wherein an amount of the decrease of the bias current caused by said bias current switching means is approximately 20 to 50% with respect to that of the bias current before being decreased.

11. An apparatus according to claim 4, wherein an amount of the decrease of the bias current caused by said bias current switching means is approximately 20 to 50% with respect to that of the bias current before being decreased.

12. An apparatus according to claim 5, wherein an amount of the decrease of the bias current caused by said bias current switching means is approximately 20 to 50% with respect to that of the bias current before being decreased.

13. An apparatus according to claim 6, wherein an amount of the decrease of the bias current caused by said bias current switching means is approximately 20 to 50% with respect to that of the bias current before being decreased.

14. An apparatus according to claim 7, wherein an amount of the decrease of the bias current caused by said bias current switching means is approximately 20 to 50% with respect to that of the bias current before being decreased.

15. An apparatus according to claim 8, wherein an amount of the decrease of the bias current caused by said bias current switching means is approximately 20 to 50% with respect to that of the bias current before being decreased.

16. An apparatus according to claim 1 or 9, wherein said cue signal is a sine wave signal with a frequency within a range from about 10 Hz to 30 Hz for preventing the higher harmonic distortion of the cue signal from distinguishedly appearing in an acoustic frequency band even when the bias magnetic field is weakened by said bias magnetic field weakening means.

17. An apparatus according to claim 2 or 3, wherein said cue signal is a sine wave signal with a frequency within a range from about 10 Hz to 30 Hz for preventing the higher harmonic distortion of the cue signal from distinguishedly appearing in an acoustic frequency band even when the bias current is weakened by said bias current switching means.

18. An apparatus according to claim 4, wherein said cue signal is a sine wave signal with a frequency within a range from about 10 Hz to 30 Hz for preventing the higher harmonic distortion of the cue signal from distinguishedly appearing in an acoustic frequency band even when the bias current is weakened by said bias current switching means.

19. An apparatus according to claim 5, wherein said cue signal is a sine wave signal with a frequency within a range from about 10 Hz to 30 Hz for preventing the higher harmonic distortion of the cue signal from distinguishedly appearing in an acoustic frequency band even when the bias current is weakened by said bias current switching means.

20. An apparatus according to claim 6, wherein said cue signal is a sine wave signal with a frequency within a range from about 10 Hz to 30 Hz for preventing the higher harmonic distortion of the cue signal from distinguishedly appearing in an acoustic frequency band even when the bias current is weakened by said bias current switching means.

21. An apparatus according to claim 7, wherein said cue signal is a sine wave signal with a frequency within a range from about 10 Hz to 30 Hz for preventing the higher harmonic distortion of the cue signal from distinguishedly appearing in an acoustic frequency band even when the bias current is weakened by said bias current switching means.

22. An apparatus according to claim 8, wherein said cue signal is a sine wave signal with a frequency within a range from about 10 Hz to 30 Hz for preventing the higher harmonic distortion of the cue signal from distinguishedly appearing in an acoustic frequency band even when the bias current is weakened by said bias current switching means.

23. An apparatus according to claim 10, wherein said cue signal is a sine wave signal with a frequency within a range from about 10 Hz to 30 Hz for preventing the higher harmonic distortion of the cue signal from distinguishedly appearing in an acoustic frequency band even when the bias current is weakened by said bias current switching means.

24. An apparatus according to claim 11, wherein said cue signal is a sine wave signal with a frequency within a range from about 10 Hz to 30 Hz for preventing the higher harmonic distortion of the cue signal from distinguishedly appearing in an acoustic frequency band even when the bias current is weakened by said bias current switching means.

25. An apparatus according to claim 12, wherein said cue signal is a sine wave signal with a frequency within a range from about 10 Hz to 30 Hz for preventing the higher harmonic distortion of the cue signal from distinguishedly appearing in an acoustic frequency band even when the bias current is weakened by said bias current switching means.

26. An apparatus according to claim 1 or 9, further comprising an erasing head whose operation is stopped when the superposing recording of said cue signal is performed.

27. An apparatus according to claim 16, further comprising an erasing head whose operation is stopped when the superposing recording of said cue signal is performed.

* * * * *